United States Patent
Xu (10) Patent No.: US 12,471,046 B2
(45) Date of Patent: Nov. 11, 2025

(54) METHOD AND APPARATUS FOR RANDOM ACCESS RESOURCE CONFIGURATION

(71) Applicant: Lenovo (Beijing) Ltd., Beijing (CN)

(72) Inventor: Min Xu, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 470 days.

(21) Appl. No.: 18/004,280

(22) PCT Filed: Jul. 8, 2020

(86) PCT No.: PCT/CN2020/100839
§ 371 (c)(1),
(2) Date: Jan. 4, 2023

(87) PCT Pub. No.: WO2022/006772
PCT Pub. Date: Jan. 13, 2022

(65) Prior Publication Data
US 2023/0247673 A1    Aug. 3, 2023

(51) Int. Cl.
*H04W 56/00* (2009.01)
*H04W 74/0833* (2024.01)

(52) U.S. Cl.
CPC ... *H04W 56/0045* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 11,206,693 | B2 * | 12/2021 | Xiong | H04W 74/002 |
| 11,968,713 | B2 * | 4/2024 | Xiong | H04W 74/0891 |
| 12,120,731 | B2 * | 10/2024 | Wang | H04B 7/2041 |
| 12,302,405 | B2 * | 5/2025 | Lin | H04W 74/0833 |
| 2020/0229242 | A1 * | 7/2020 | Xiong | H04W 74/002 |
| 2020/0275492 | A1 * | 8/2020 | Lei | H04W 72/0446 |

(Continued)

FOREIGN PATENT DOCUMENTS

| | | |
|---|---|---|
| CN | 109906661 A | 6/2019 |
| CN | 110876205 A | 3/2020 |

(Continued)

OTHER PUBLICATIONS

Ericsson, "Procedure for Two-step RACH", 3GPP TSG-RAN WG1 Meeting #99, R1-1912672, Reno, USA [retrieved Dec. 27, 2022]. Retrieved from the Internet <https://www.3gpp.org/ftp/tsg_ran/wg1_rL 1/TSGR1_99/Docs/>., Nov. 2019, 12 Pages.

(Continued)

*Primary Examiner* — Faiyazkhan Ghafoerkhan
(74) *Attorney, Agent, or Firm* — FIG. 1 Patents (57) ABSTRACT

The present application relates to a method and an apparatus for random access resource configuration. One embodiment of the present application provides a method performed by a Base Station (BS), which includes: transmitting random access occasion configuration, wherein the random access occasion configuration is associated with at least one of the following parameters of a UE: a propagation delay, a timing advance, a location, and a distance; and receiving preambles in a preamble receiving window corresponding to the random access occasion configuration.

20 Claims, 10 Drawing Sheets

(56) References Cited

U.S. PATENT DOCUMENTS

| | | | | |
|---|---|---|---|---|
| 2021/0329691 A1* | 10/2021 | Sun | ............... | H04W 74/002 |
| 2022/0070930 A1* | 3/2022 | Xiong | ............... | H04W 74/0891 |
| 2022/0225424 A1* | 7/2022 | Wang | ............... | H04W 74/006 |
| 2022/0225426 A1* | 7/2022 | Yu | ............... | H04W 64/003 |
| 2022/0264636 A1* | 8/2022 | Wang | ............... | H04B 7/18513 |
| 2022/0272760 A1* | 8/2022 | Murray | ............... | H04W 74/0836 |
| 2023/0056778 A1* | 2/2023 | Lin | ............... | H04B 7/18508 |
| 2023/0247673 A1* | 8/2023 | Xu | ............... | H04B 7/18563 |
| | | | | 370/329 |

FOREIGN PATENT DOCUMENTS

| | | |
|---|---|---|
| WO | 2020091518 A1 | 5/2020 |
| WO | 2020092059 A1 | 5/2020 |

OTHER PUBLICATIONS

PCT/CN2020/100839, "International Preliminary Report on Patentability", PCT Application No. PCT/CN2020/100839, Jan. 19, 2023, 5 pages.

PCT/CN2020/100839, "International Search Report and Written Opinion", PCT Application No. PCT/CN2020/100839, Mar. 25, 2021, 6 pages.

Zte, et al., "TP on RACH capacity calculation based on typical cell size", 3GPP TSG-RAN WG2 Meeting#108, R2-1915081, Reno, USA [retrieved Dec. 27, 2022]. Retrieved from the Internet <https://www.3gpp.org/ftp/tsg_ran/WG2_RL2/TSGR2_108/Docs>., Nov. 2019, 6 Pages.

\* cited by examiner

METHOD AND APPARATUS FOR RANDOM ACCESS RESOURCE CONFIGURATION

TECHNICAL FIELD

The present application relates to wireless communication technology, especially to a method and an apparatus for random access resource configuration.

BACKGROUND OF THE INVENTION

In Non-terrestrial Networks (NTN), the user equipment (UE) in different locations in the cell may experience large differential delays. As a result, the preambles sent by the UEs in the same Random Access Channel (RACH) occasion (RO) may reach the network at different times. In order to receive these preambles, the preamble receiving window should be longer than 2× the maximum delay difference.

The preamble receiving windows of consecutive RACH occasions could overlap if the time interval between two consecutive RACH occasions is less than 2× the maximum delay difference. In NTN, the maximum delay difference might be up to 6.44 ms. Therefore, the network may have to sacrifice the density of supported UEs, or the number of supported UEs in a cell to avoid such overlapping.

SUMMARY

In view of the above, it is desirable to provide a solution to support more UEs and avoid the overlapping of the preamble receiving windows.

One embodiment of the present application provides a method performed by a Base Station (BS), which includes: transmitting random access occasion configuration, wherein the random access occasion configuration is associated with at least one of the following parameters of a UE: a propagation delay, a timing advance, a location, and a distance; and receiving preambles in a preamble receiving window corresponding to the random access occasion configuration.

Another embodiment of the present application provides a method performed by a User Equipment, which includes: receiving random access occasion configuration, wherein the random access occasion configuration is associated with at least one of the following parameters of the UE: a propagation delay, a timing advance, a location, and a distance; and selecting a random access occasion from the random access occasion configuration.

Yet another embodiment of the present application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a Base Station (BS), which includes: transmitting random access occasion configuration, wherein the random access occasion configuration is associated with at least one of the following parameters of a UE: a propagation delay, a timing advance, a location, and a distance; and receiving preambles in a preamble receiving window corresponding to the random access occasion configuration.

Still another embodiment of the present application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a User Equipment, which includes: receiving random access occasion configuration, wherein the random access occasion configuration is associated with at least one of the following parameters of the UE: a propagation delay, a timing advance, a location, and a distance; and selecting a random access occasion from the random access occasion configuration.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
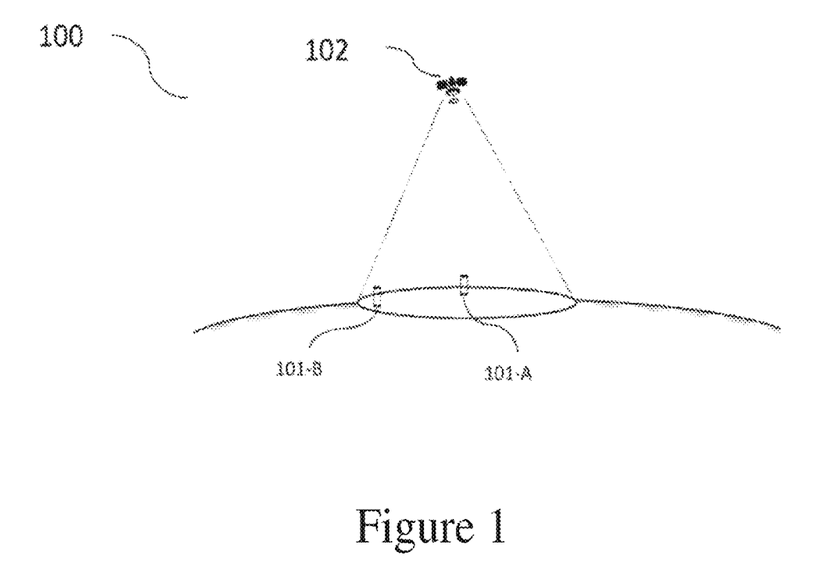
FIG. 1 illustrates a schematic diagram of a wireless communication system in accordance with some embodiments of the present disclosure.

FIG. 1 illustrates a schematic diagram of a wireless communication system 100 in accordance with some embodiments of the present application.

As shown in FIG. 1, the wireless communication system 100 includes two UEs, UE 101-A and UE 101-B, and a BS 102, for example, a satellite BS. Although merely one BS is illustrated in FIG. 1 for simplicity, it is contemplated that the wireless communication system 100 may include more BSs in some other embodiments of the present application. Similarly, although merely two UEs are illustrated in FIG. 1 for simplicity, it is contemplated that the wireless communication system 100 may include more UEs in some other embodiments of the present application. In the coverage of BS 102, UE 101-A is located at the nearest position to BS 102, that is, the distance between the position of UE 101-A and BS 102 is the smallest among all the positions in the coverage of BS 102, and UE 101-B is located at the farthest location to BS 102.

The BS 102 may also be referred to as an access point, an access terminal, a base, a macro cell, a node-B, an enhanced node B (eNB), a gNB, a home node-B, a relay node, or a device, or described using other terminology used in the art. The BS 102 is generally part of a radio access network that may include a controller communicably coupled to the BS 102.

The UE 101-A may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 101-A may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101-A may include wearable devices, such as smart watches, fitness bands, optical head-mounted displays, or the like. Moreover, the UE 101-A may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Figure 2:
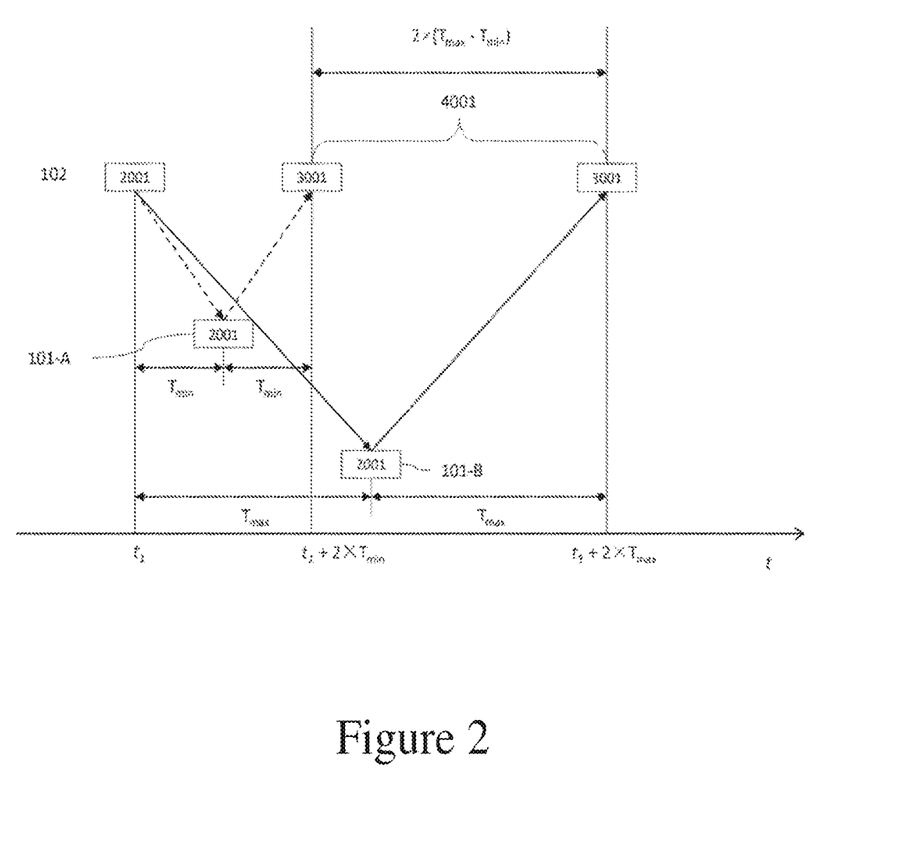
FIG. 2 illustrates a preamble receiving window for a RACH occasion (RO).

FIG. 2 illustrates a preamble receiving window for a RACH occasion (RO). In FIG. 2, the horizontal axis represents time, t, and there are two UEs, UE 101-A and UE 101-B. As illustrated in FIG. 1, UE 101-A is located at the nearest position to BS 102 in the coverage of BS 102, and UE 101-B is located at the furthest portion to BS 102. The propagation delay from BS 102 to UE 101-A is the minimum delay, and the propagation delay from BS 102 to UE 101-B is the maximum delay.

BS 102 transmits RO 2001 to the UEs at time $t_1$, and after the minimum delay time, which is represented as $T_{min}$, UE 101-A receives RO 2001, and transmits preamble 3001 to BS 102. The delay for preamble 3001 from UE 101-A to BS 102 is also $T_{min}$. Therefore, BS 102 needs to receive the preamble from UE 101-A at time $t_1+2\times T_{min}$. Similarly, after the maximum delay time $T_{max}$, UE 101-B receives RO 2001, and transmits preamble 3001 to BS 102. The delay for preamble 3001 from UE 101-B to BS 102 is also $T_{max}$. Therefore, BS needs to receive the preamble UE 101-B at time $t_1+2\times T_{max}$. In view of the above, the preamble receiving window 4001 for RO 2001 is from time $t_1+2\times T_{min}$ to $t_1+2\times T_{max}$, and the length of the preamble receiving window 4001 for RO 2001 is $2\times(T_{max}-T_{min})$, such that the network can receive preambles from all the UEs. The value $T_{max}-T_{min}$ is also referred as the maximum one way differential delay, or maximum delay difference, which is the delay difference between the UE at the farthest location to the BS and the UE at the nearest location to the BS.

Figure 3:
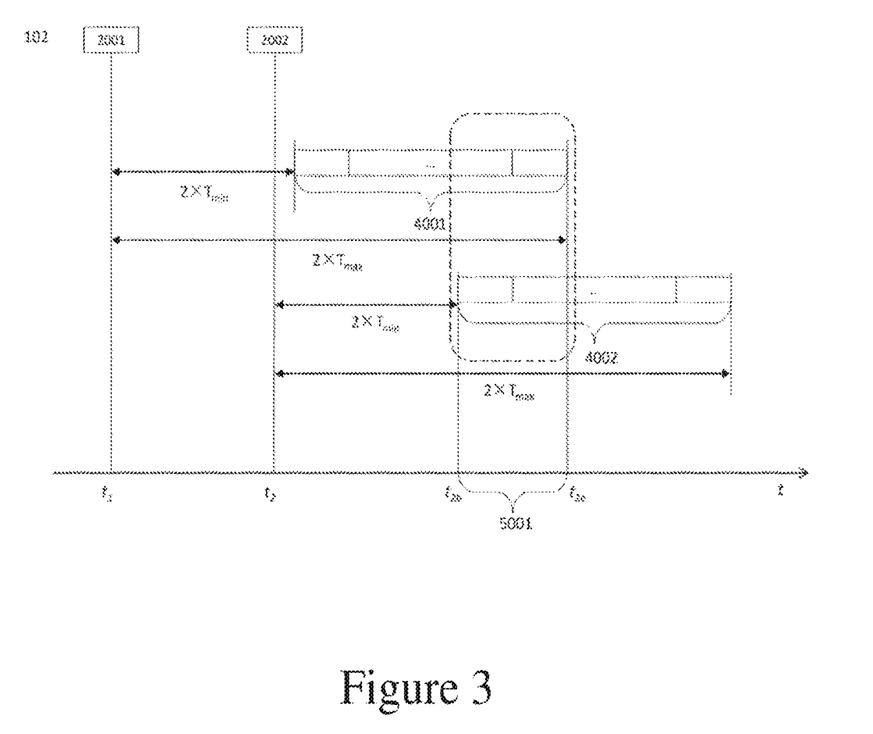
FIG. 3 illustrates an ambiguity on preamble reception at the network side.

FIG. 3 illustrates an ambiguity on preamble reception at the network side. In FIG. 3, there are two consecutive ROs, RO 2001 and RO 2002. BS 102 transmits RO 2001 at time $t_1$, and the preamble receiving window 4001 for RO 2001 ends at time $t_{1e}$, which equals to $t_1+2\times T_{max}$; BS 102 transmits RO 2002 at time $t_2$, and the preamble receiving window 4002 for RO 2002 begins at time $t_{2b}$, which equals to $t_2+2\times T_{min}$. Based on calculation, the minimum interval between RO 2002 and RO 2001, $t_2-t_1$, may not less than $2\times(T_{max}-T_{min})$ to ensure there is no overlapping between the two preamble receiving windows.

If the interval between RO 2002 and RO 2001 is less than the minimum interval, $2\times(T_{max}-T_{min})$ as shown in FIG. 3, then the preamble receiving window 4002 begins earlier than the end of the preamble receiving window 4001, and there is an overlapping time period 5001 between the two preamble receiving windows.

When a preamble is received, the network needs to know which RO the preamble is related to in order to estimate the accurate timing advance. As shown in FIG. 3, if BS 102 receives a preamble in the overlapping window 5001, it might not know to which RO the preamble relates, RO 2001, or RO 2002.

In terrestrial networks this issue may not be critical since that the delay difference in a cell can be negligible comparing to the time interval between ROs.

However, in NTN, the delay difference in a cell can be relatively large due to the size of the cell and satellite-to-ground propagation delay. According to a table in 3GPP documents, which is presented in the following table:

| Maximum delay difference × 2 for typical GEO and LEO cell | | |
|---|---|---|
| | Typical cell size | Maximum delay difference × 2 |
| GEO | 1000 km | 6.44 ms |
| | 500 km | 3.26 ms |
| LEO | 200 km | LEO at 600 km altitude orbit: 1.306 ms |
| | | LEO at 1200 km altitude orbit: 1.308 ms |
| | 100 km | LEO at 600 km altitude orbit: 0.654 ms |
| | | LEO at 1200 km altitude orbit: 0.654 ms |

According to the above table, the typical cell size for a geosynchronous orbit satellite (GEO) is 1000 km, and the maximum delay difference×2 is 6.44 ms. In other words, the value $2\times(T_{max}-T_{min})$ is 6.44 ms or 3.26 ms. In order to avoid overlapping between the two preamble receiving windows, the time interval between two consecutive ROs, for example, RO 2002 and RO 2001, should be larger than 6.44 ms. Similarly, the time interval between two consecutive ROs in a low earth orbit satellite (LEO600) with a cell size of 200 km, should be larger than 1.306 ms.

Figure 4A:
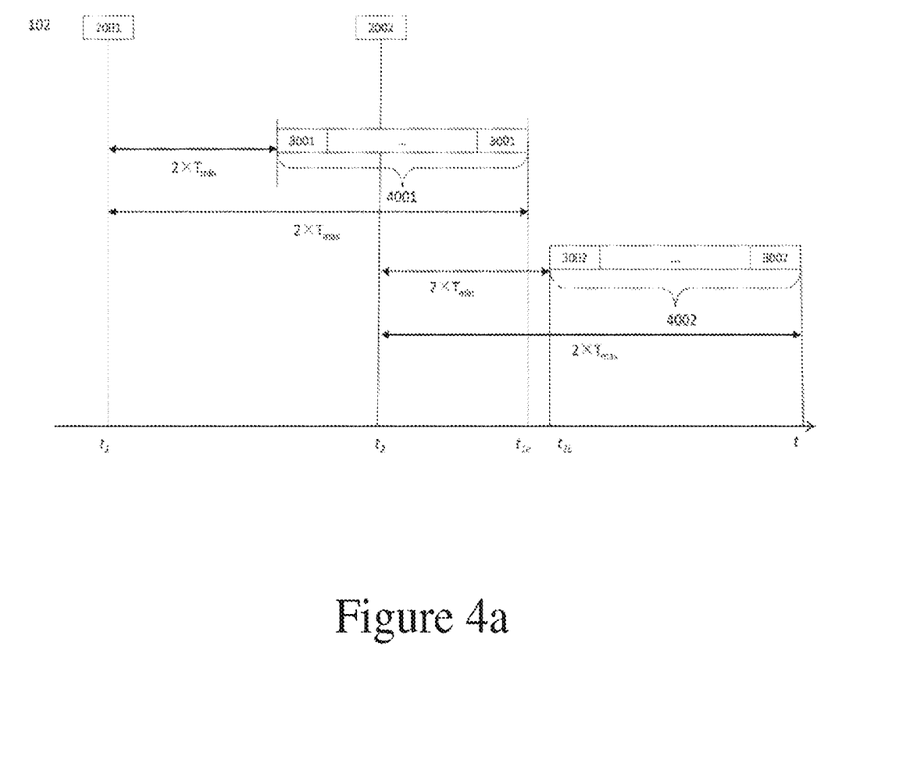
FIG. 4a illustrates one solution for avoiding overlapping of the preamble receiving window.

FIG. 4a illustrates one solution for avoiding overlapping of the preamble receiving window. Specifically, the interval between two consecutive ROs 2001 and 2002, $t_2-t_1$, is larger than the maximum delay difference×2. That is, the value $t_2-t_1$, is larger than the value $2\times(T_{max}-T_{min})$. In this way, there is no overlapping between the preamble receiving windows. However, this solution requires large time intervals between ROs and therefore the supported UE density is reduced.

In view of the above, the preamble receiving windows of consecutive ROs could overlap if the time interval between them is less than 2× the maximum delay difference within the cell, which makes the network difficult to link the received preamble to the corresponding RO. The network may have to sacrifice the density of supported UE or the number of supported UEs in a cell to avoid such overlapping.

Figure 4B:
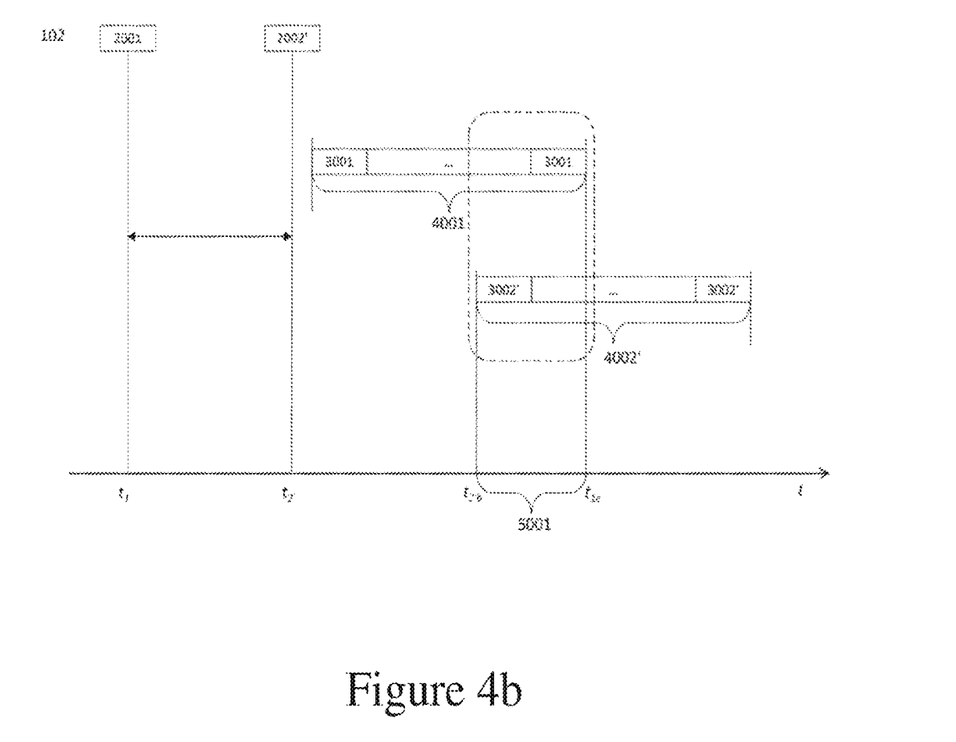
FIG. 4b illustrates one solution for distinguishing the preambles in the overlapping windows.

FIG. 4b illustrates one solution for distinguishing the preambles for the overlapping windows. In this solution, preambles are divided into groups and mapped to different ROs, and ROs with timing separation less than 2×maximum delay difference are assigned with different groups of preambles.

Specifically, the preambles are divided into different groups for different ROs, so that ROs allocated to different preamble groups can have time interval less than 2× the maximum delay difference within the cell. For example, RO 2001 is associated with the first preamble group, and RO 2002' is associated with the second preamble group, therefore, during the overlapping period, the network can still relate the preamble with the corresponding RO. However, grouping the preambles still sacrifices the supported UE density because that the preambles cannot be reused in the period of 2× the maximum delay difference within the cell.

A satellite beam typically forms an NTN cell with its footprint, i.e. projection on the earth. For a satellite with more accurate beamforming capability, it is possible that several synchronization signal and PBCH block (SSB) beams can be provided in an NTN cell. It is contemplated that the network may associate ROs to different SSB beams covering different locations to avoid overlapping of windows in a cell.

The typical beam footprint size for the LEO satellite and the Medium-Earth Orbit (MEO) satellite is from 100 km to 1000 km, the typical beam footprint size for the GEO satellite is from 200 km to 3500 km, and the typical beam footprint size for the Unmanned Aircraft Systems (UAS) platform, including High Altitude Platform Station (HAPS), is from 5 km to 200 km. Based on the beam footprint size, the delay difference within an SSB beam cannot be easily ignored, therefore, the above issue still exists within an SSB beam coverage.

As can be seen, the solutions in FIGS. 4a and 4b cannot avoid the preamble window overlapping without sacrificing the supported UE density, and the main reason is that the size of required preamble receiving window (i.e. 2× the maximum delay difference within the cell) is not changed.

The present disclosure proposes another solution with accurate window configuration based on at least one of the following parameters of the UE, the propagation delay, the timing advance, the location and the distance of a UE to a reference location. In NTN work item phase in Rel-17, the UEs are assumed to have the positioning capability, the timing advance (TA) can be obtained and corrected in time. This present disclosure takes the advantage of these parameters and provides enhancement for RO allocation and selection.

Specifically, the present disclosure proposes to configure the random access occasion configuration based on the propagation delay from the BS and the UE, the timing advance, the location of the UE, or a distance between the UE and reference locations. The random access occasion configuration may be one or more ROs or RO sets determined based on the above parameters of the UE, or may be one or more ROs or RO sets with one or more associated application conditions.

Figure 5:
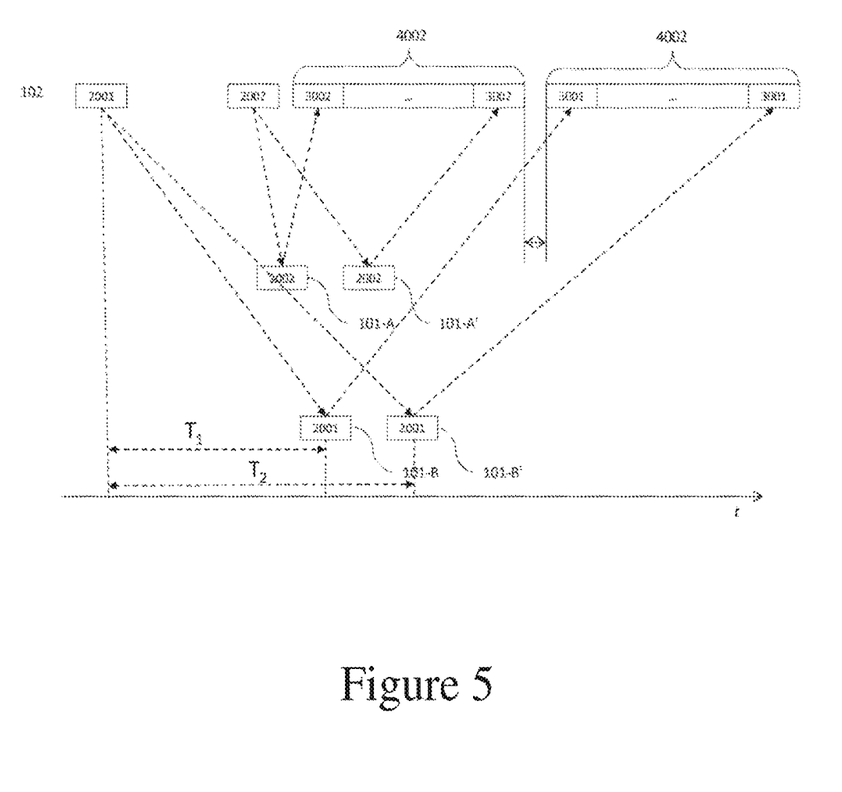
FIG. 5 illustrates one solution for avoiding overlapping of the preamble receiving window according to some embodiments of the present disclosure.

FIG. 5 illustrates one solution for avoiding overlapping of the preamble receiving window according to some embodiments of the present disclosure.

As shown in FIG. 5, UE 101-B and UE 101-B' are located at further locations to the BS compared with UE 101-A and UE 101-A', in other words, the propagation delays of UE 101-B and UE 101-B' are greater, the timing advances are greater, and the distances to BS 102 are longer. BS 102 configures RO 2001 for these UEs based on the above parameters of the UEs, and the receiving window 4001 is located at a late position in the horizontal axis.

Similarly, UE 101-A and UE 101-A' are located at nearer locations to the BS compared with UE 101-A and UE 101-A', in other words, the propagation delays are smaller, the timing advances are smaller, and the distances are shorter. BS 102 configures RO 2002 for these UEs based on the above parameters of the UEs, and the receiving window 4002 is located at an early location in the horizontal axis.

Although RO 2002 is transmitted to UEs later than RO 2001, BS 102 receives the preamble 3002 at the receiving window 4002 which corresponds to RO 2002 earlier than receiving the preamble 3001, because UE 101-A is at a nearer location to BS 102 compared with UE 101-B, thus the propagation delay of UE 101-A is smaller, and accordingly, the preamble corresponding to RO 2002 is received early. As can be seen, the preamble receiving window is more accurate and flexible.

In one embodiment, the RO is configured based on the locations of the UE. For example, there is an area covered by a specific SSB beam, and the beam is associated with a RO 2001, thus RO 2001 is selected. In another embodiment, the RO is configured based on reference locations. That is, if a reference location is nearest reference location to a UE, then the UE uses the RO associated with the reference location.

The BS could obtain the parameters of the UE, namely, the propagation delay, the timing advance, the location of the UEs from the UE per se, via UE reporting, or from the core network, or from a location service functional entity, for instance, location management function (LMF), or from other BS. Alternatively, the BS might not have these parameters, then BS would configure ROs with application conditions, and relies on the UE to select an appropriate RO based on the application conditions and these parameters of it. In the present disclosure, the ROs configured based on the abovementioned parameters or the ROs with application conditions associated with the abovementioned parameters are referred to as delay/location-based RO configuration hereinafter in the present disclosure.

According to the present disclosure, UEs with similar propagation delays from the BS, UEs with similar timing advances, UEs adjacent to each other, or UEs with similar distance to the BS are assigned to the same RO. By do so, the preamble receiving window for each RO may shrink, so that the density of supported UEs, or the number of supported UEs in a cell can increase.

Figure 6:
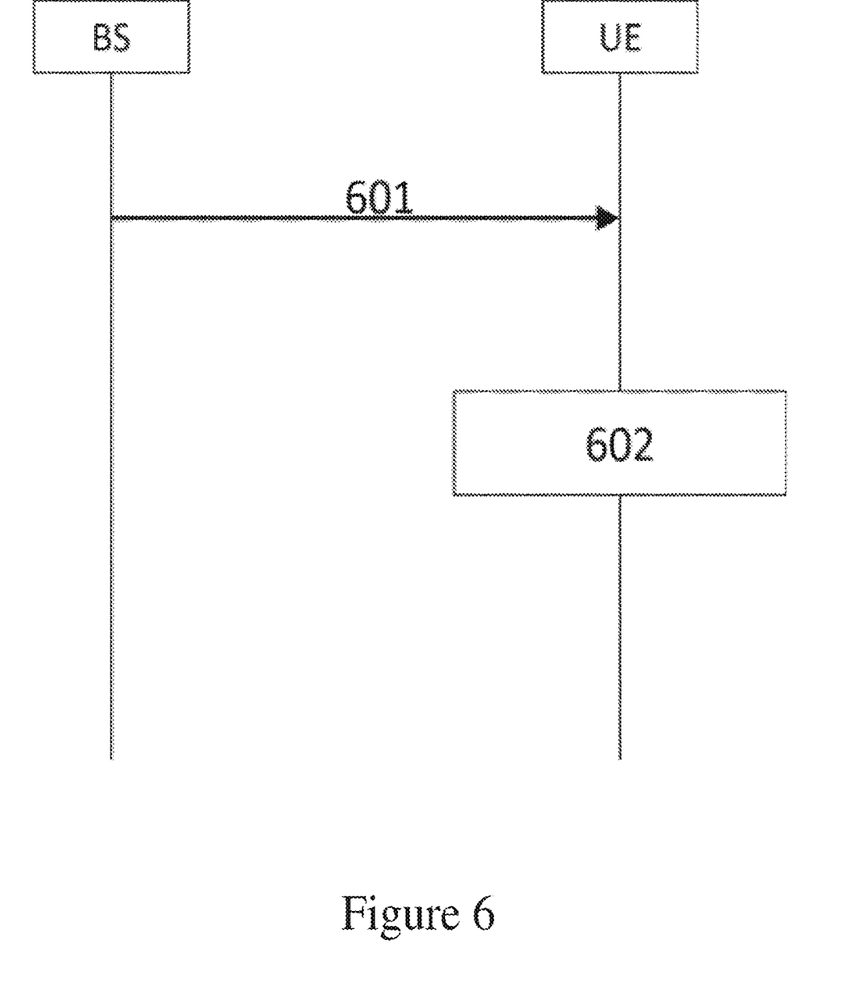
FIG. 6 illustrates one flow chart of the solution for avoiding overlapping of the preamble receiving window according to some embodiments of the present disclosure.

FIG. 6 illustrates one flow chart of the solution for avoiding overlapping of the preamble receiving window according to some embodiments of the present disclosure.

In step 601, the BS transmits the delay/location-based RO configuration to the UE. The delay/location-based RO configuration includes at least one available RO for the UEs. The delay/location-based RO configuration may further include at least one application conditions. Based on these application conditions, the UE can select a RO from the delay/location-based RO configuration. The delay/location-based RO configuration may include at least one reference based locations, or include an area covered by a specific SSB beam that associates with the at least one ROs.

BS 102 may transmit the delay/location-based RO configuration to UEs via system information broadcasting, alternatively, BS 102 may transmit the delay/location-based RO configuration to a UE via explicit signaling, for example, via RRC signaling. When the delay/location-based RO configuration is broadcasted to the UEs, it may include application conditions for the UEs to select a RO from the delay/location-based RO configuration; when delay/location-based RO configuration is indicated to a specific UE via RRC signaling, it might only include one specific RO selected by the BS.

In 5G NR and 4G LTE communication systems, the delay/location-based RO configuration, which includes available ROs for the UEs and/or application conditions may be included in the information element (IE), for example, the IE RACH-ConfigDedicated for random access.

In 5G NR, the delay/location-based RO configuration, may also be included in information elements (IEs), for example, the IE BeamFailureRecoveryConfig for beam failure recovery; the IE RACH-ConfigCommonTwoStepRA for 2-step random access; or the IE SI-SchedulingInfo for on-demand system information acquisition. The BS may configure several parameters to indicate the delay/location-based RO configuration, for example, the parameter ra-ssb-OccasionMaskIndex or msgA-SSB-SharedRO-MaskIndex-r16.

In 4G LTE, the BS may also configure several parameters to indicate the delay/location-based RO configuration, for example, the parameter ra-PRACH-MaskIndex. The delay/location-based RO configuration may also be included or indicated in other IEs or parameters, and the present disclosure has no intention of limiting the same.

In one embodiment, the BS might not have the parameters of the UEs, i.e. the propagation delay, the timing advance, the location, or the distance to a reference location. Under this condition, the BS could configure at least one RO with each RO being configured with at least one application conditions, and the application conditions relate to at least one parameter of the UE, that is, the propagation delay, the timing advance, the location and the distance of a UE to a reference location. Correspondingly, the UE needs to select a RO based on these parameters.

For contention-free random access (CFRA), the BS could configure at least one RO to at least one UE, a RO can be selected, or shall be selected only if one of the parameters, i.e. the propagation delay, the timing advance, the location, and the distance, of the at least one UE satisfies at least one condition defined by at least one threshold. For example, in FIG. 5, RO 2001 is selected if the propagation delay of a UE is within the range from $T_1$ to $T_2$. For another example, RO 2001 is selected if the timing advance or distance of a UE is less than a threshold.

For contention-based random access (CBRA), the BS could configure at least one RO set to at least one UE, a RO set may include one or more ROs. A RO set can be selected, or shall be selected only if one of the parameters, i.e. the propagation delay, the timing advance, the location, and the distance, of the at least one UE satisfies at least one condition defined by at least one threshold. For example, a RO set is selected if the propagation delay of a UE is within the range from $T_1$ to $T_2$. For another example, a RO set is selected if the timing advance or distance of a UE is less than a threshold.

More specifically, the application conditions configured by the BS might include at least one of the following conditions:

i. A RO (for example, RO N1) or a RO Set (for instance, RO set M1) is selected if the propagation delay or the timing advance of the UE(s) is less than a threshold, for example, 1 ms.

ii. A RO (for example, RO N2) or a RO Set (for instance, RO set M2) is selected if the propagation delay or the timing advance of the UE(s) is larger than a threshold, e.g., 5 ms.

iii. A RO (for example, RO N3) or a RO Set (for instance, RO set M3) is selected if the propagation delay or the timing advance of the UE(s) is less than one threshold and larger than another threshold, for instance, the propagation delay is less than 5 ms and larger than 1 ms.

iv. A RO (for example, RO N4) or a RO Set (for instance, RO set M4) is selected if the distance from the UE to the indicated reference location is shorter than a threshold. For example, the distance is shorter than 10 km.

v. A RO (for example, RO N5) or a RO Set (for instance, RO set M5) is selected if the distance from the UE to the indicated reference location is longer than a threshold, e.g., the distance is longer than 50 km.

vi. A RO (for example, RO N6) or a RO Set (for instance, RO set M6) is selected if the distance from the UE to the indicated reference location is shorter than one threshold and longer than another threshold. For example, the distance is shorter than 10 km and longer than 50 km.

vii. A RO (for example, RO N7) or a RO Set (for instance, RO set M7) is selected if the location of the UE belongs to a specific region, wherein the specific region could be an area covered by a specific SSB beam that associates with RO N7 or RO Set M7.

viii. A RO (for example, RO N8) or a RO Set (for instance, RO set M8) is selected if a reference location associated with RO N8 or RO set M8 is the nearest reference location to the UE.

It should be noted that a RO or a RO set being selected has two meanings: one is it should be selected, the other is it can be selected. There might be other types of application conditions, and the present disclosure has no intention of limiting the same, and the solution also applies with other application conditions.

In another embodiment, the BS is aware of the propagation delay, timing advance, the location, or the distance to a reference location of the UEs, it could configure at least one RO with each RO having at least one application conditions regarding the propagation delay, the timing advance, and the location of the UEs.

For CFRA, the BS could configure at least one RO to at least one UE based on at least one of the parameters of the at least one UE, i.e. the propagation delay, the timing advance, the location, and the distance. For example, in FIG. 5, RO 2001 is selected by the BS and transmitted to UE 101-B since the propagation delay of UE 101-B is within the range from $T_1$ to $T_2$. For another example, RO 2001 is selected if the timing advance or distance of UE 101-B is less than a threshold.

For CBRA, the BS could configure at least one RO set to at least one UE based on at least one of the parameters of the at least one UE, i.e. the propagation delay, the timing advance, the location, and the distance. For example, a RO set is selected by the BS and transmitted to UE 101-B because the propagation delay of UE 101-B is within the range from $T_1$ to $T_2$. For another example, a RO set is selected if the timing advance or distance of a UE is less than a threshold.

More specifically, based on the propagation delay, the timing advance, the distance, and/or the location of a UE, the BS configures a RO or a RO set to the UE based on at least one of the following conditions:
  i. The propagation delay or the timing advance of the UE is less than a threshold, for example, less than 1 ms.
  ii. The propagation delay or the timing advance of the UE is larger than a threshold, for example, larger than 5 ms.
  iii. The propagation delay or the timing advance of the UEs is less than one threshold and larger than another threshold, for example, less than 5 ms and larger than 1 ms.
  iv. The distance from the UE to the indicated reference location is shorter than a threshold, for example, shorter than 10 km.
  v. The distance from the UE to the indicated reference location is longer than a threshold, for example, longer than 100 km.
  vi. The distance from the UE to the indicated reference location is shorter than one threshold and longer than another threshold, for example, shorter than 100 km and longer than 10 km.
  vii. The location of the UE belongs to a specific region, and the specific region could be an area covered by a specific SSB beam that associates with the configured RO.
  viii. A reference location is the nearest reference location to the UE.

The BS may configure the RO for more than one UE in a similar fashion. There might be other types of conditions, and the present disclosure has no intention of limiting the same, and the solution also applies with other conditions.

In step 602, after the UE receives the delay/location-based RO configuration, the UE selects a RO from the configuration. In one embodiment, if the received delay/location-based RO configuration includes at least one application condition, the UE first check the at least one application condition. For example, in FIG. 5, if the propagation delay of the UE is from $T_1$ to $T_2$, and there is an application condition indicates that RO 2001 is selected if the propagation delay is from $T_1$ to $T_2$, then the UE might select RO 2001.

If the received delay/location-based RO configuration includes at least one application condition, the UE selects a RO in the configuration based on one or more application conditions it satisfies. For CFRA, the UE could select the RO or select one of the ROs with one or more application conditions it satisfies. For CBRA, the UE could first select the RO set or select one of the RO sets with one or more application conditions it satisfies, then it could select one RO in the selected RO set.

When the UE complies with multiple application conditions, it may select one RO from the multiple ROs associated with the multiple application conditions. For instance, the UE may stop checking the application conditions once the UE find it complies with one application condition, and selects the RO associated with the complied application condition. Alternatively, the application conditions may have levels, and the UE selects the RO associated with an application condition with a highest level among one or more application conditions which the UE satisfies.

The level might be priority level of an application condition, for instance, if UE satisfies: i) an application condition related to the propagation delay; and ii) an application condition related to the distance, and the application condition i) has a higher priority level than the application condition ii), then the UE selects the RO or RO set associated with the application condition i).

The level might be compliance level of an application condition, for instance, assuming there are two application conditions: i) an application condition related to the propagation delay within 1 ms and 5 ms; and ii) an application condition related to the distance within 10 km and 100 km, and the propagation delay of the UE is 3 ms, the distance of the UE is 100 km. The compliance level of the two application conditions are different, and UE determines that the compliance level of application condition i) is higher than that of application condition ii), and UE selects the RO or RO set associated with application condition i). There might be other type of levels to determine which RO to be selected, and the present disclosure has no intention of limiting the same.

If the received delay/location-based RO configuration does not include any application condition, which means the BS is aware of at least one parameters of the UE, then the UE selects a RO in the configuration. For CFRA, the UE could select the indicated RO or select one of the indicated ROs. For CBRA, the UE could select one RO from the indicated RO set.

In one embodiment, the BS configures at least one RO or RO set with each RO or RO set having at least application condition, the UE selects a RO or a RO set in the configuration based on at least one of the following application conditions it satisfies:
  i. The propagation delay or the timing advance of the UE is less than the indicated threshold, for example, less than 1 ms.
  ii. The propagation delay or the timing advance of the UE is larger than the indicated threshold, for example, larger than 5 ms.
  iii. The propagation delay or the advance of the UE is less than the first indicated threshold and larger than the second indicated threshold, for example, less than 5 ms and larger than 1 ms.
  iv. The distance from the UE to the indicated reference location is shorter than the indicated threshold, for example, shorter than 10 km.
  v. The distance from the UE to the indicated reference location is longer than the indicated threshold, for example, longer than 100 km.
  vi. The distance from the UE to the indicated reference location is shorter than the first indicated threshold and longer than the second indicated threshold, for example, shorter than 100 km and longer than 10 km.
  vii. The location of the UE belongs to the indicated region, and the indicated region may be an area covered by a specific SSB beam that associates with configured RO or RO set.
  viii. The indicated reference location is the nearest reference location to the UE, and the indicated reference location is associated with a RO or a RO set.

It should be noted that there might be other types of application conditions, and the present disclosure has no intention of limiting the same, and the solution also applies with other application conditions.

Figure 7:
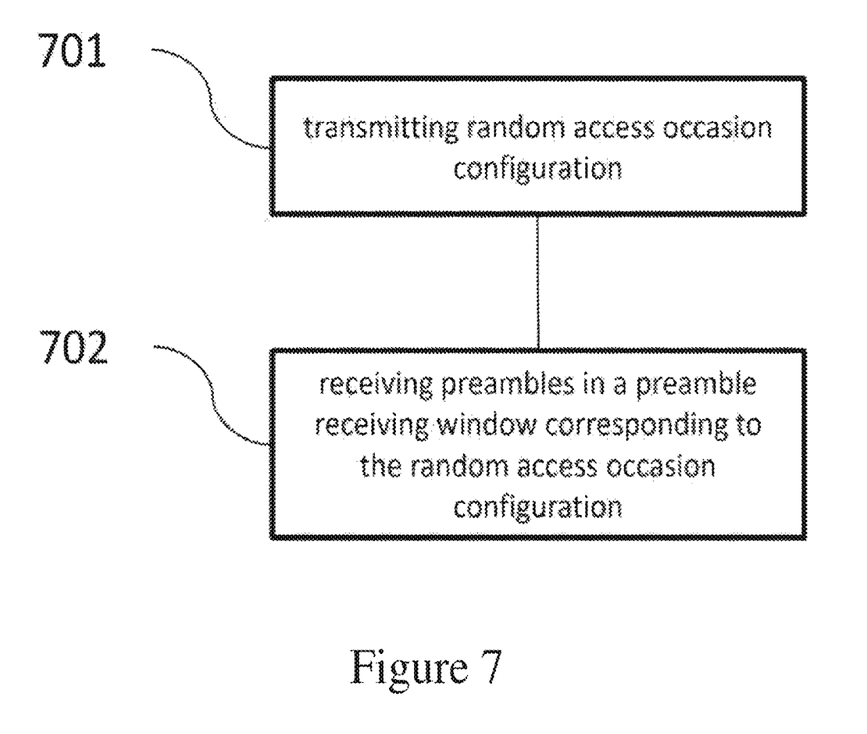
FIG. 7 illustrates a method performed by a BS for wireless communication according to some embodiments of the present disclosure.

FIG. 7 illustrates a method performed by a BS for wireless communication according to some embodiments of the present disclosure.

In step 701, the BS transmits random access occasion configuration, the random access occasion configuration is associated with at least one of the following parameters of a UE: a propagation delay, a timing advance, a location, and a distance. In step 702, the BS receives preambles in a preamble receiving window corresponding to the random access occasion configuration.

Figure 8:
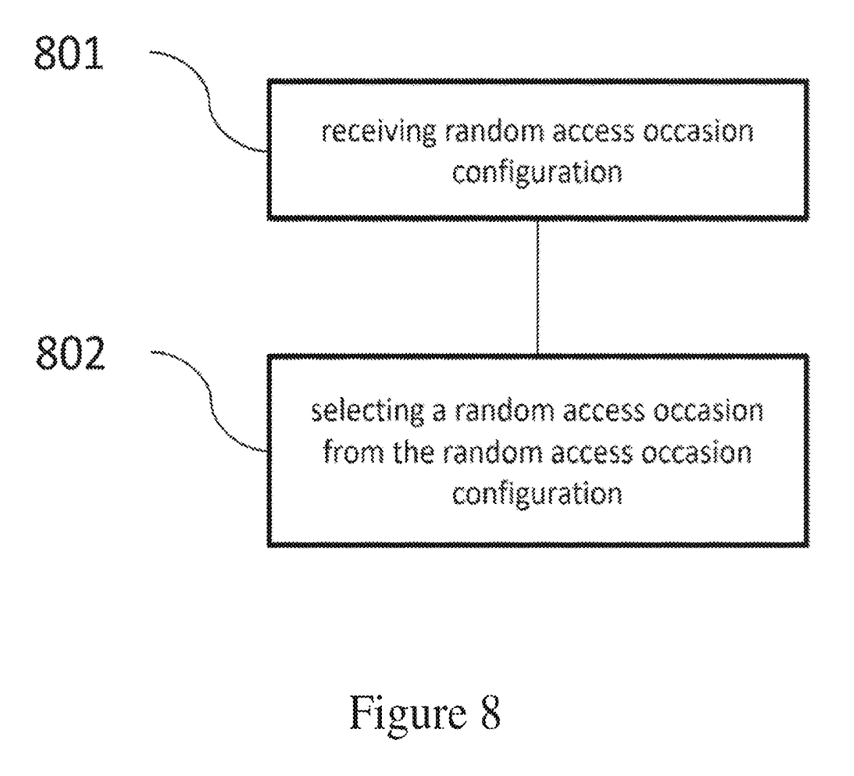
FIG. 8 illustrates a method performed by a UE for wireless communication according to some embodiments of the present disclosure.

FIG. 8 illustrates a method performed by a UE for wireless communication according to some embodiments of the present disclosure.

In step 801, the UE receives random access occasion configuration. The random access occasion configuration is associated with at least one of the following parameters of the UE: a propagation delay, a timing advance, a location, and a distance. In step 802, the UE selects a random access occasion from the random access occasion configuration The random access occasion configuration includes a reference location or multiple reference locations, which may be used to calculate the parameter distance. The random access occasion configuration may include The method of claim 1, wherein the random access occasion configuration includes an area covered by a specific SSB beam that associates with one or more random access occasions. The random access occasion configuration is included in an information element or indicated in a parameter. For example, in 5G, the random access occasion configuration is included in IE BeamFailureRecoveryConfig, or in the parameter ra-ssb-OccasionMaskIndex.

In one embodiment, the at least one parameter of the UE, i.e. the propagation delay, the timing advance, the location, or the distance to a reference location, is obtained from the UE, the core network, a location service functional entity, i.e. SMF, or other BS.

The random access occasion configuration is included in an RRC signaling or broadcasted in a system information block. For example, the BS is aware of the RO relevant parameters of a UE, thus can send a selected RO to the UE via RRC signaling. If the BS is unaware of the RO relevant parameters of a UE, the BS can broadcast the random access occasion configuration in a system information block, with application conditions, such that the UEs can select a RO based on the RO relevant parameters of them.

In one embodiment, the random access occasion configuration indicates one or more random access occasions with at least one application condition, and the at least one application condition is associated with the at least one parameter of the UE. The at least one application condition indicates that a random access occasion is selected when the at least one parameter of the UE is within a range. For example, in FIG. 5, if the propagation delay of a UE is within T1 and T2, then RO 2001 is selected. The UE may find that it satisfies more than one application conditions, and it may select a random access occasion with a highest level among one or more application conditions which the UE satisfies. For example, if UE satisfies: i) an application condition related to the propagation delay; and ii) an application condition related to the distance, the application condition regarding the propagation delay has a higher priority level than the application condition regarding the distance, then the UE selects the application condition related to the propagation delay.

In another embodiment, the random access occasion configuration indicates one or more random access occasion sets with at least one application condition, and the at least one application condition is associated with at the least one parameter of the UE. In at least one application condition indicates that a random access occasion set is selected when the at least one parameter of the UE is within a range.

In one preferred embodiment, the BS is aware of the parameters of the UEs, then the random access occasion configuration include one or more random access occasions determined based on at least one parameter of the UE. For CBRA, the BS is aware of the parameters of the UEs, then the random access occasion configuration include one or more random access occasions determined based on at least one parameter of the UE.

Figure 9:
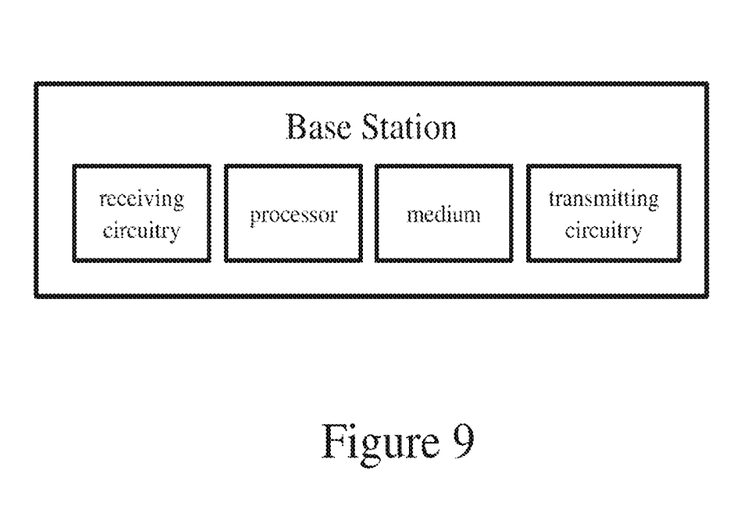
FIG. 9 illustrates a block diagram of a BS according to the embodiments of the present disclosure.

FIG. 9 illustrates a block diagram of a BS according to the embodiments of the present disclosure.

The BS may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g., the method in FIG. 7) with the receiving circuitry, the transmitting circuitry and the processor. That is, upon performing the computer executable instructions, the transmitting circuitry transmits random access occasion configuration, wherein the random access occasion configuration is associated with at least one of the following parameters of a UE: a propagation delay, a timing advance, a location, and a distance, and the receiving circuitry receives preambles in a preamble receiving window corresponding to the random access occasion configuration.

Figure 10:
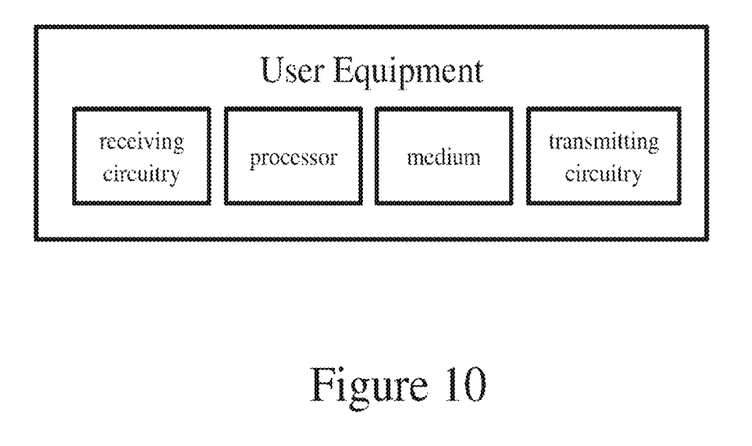
FIG. 10 illustrates a block diagram of a UE according to the embodiments of the present disclosure.

FIG. 10 illustrates a block diagram of a UE according to the embodiments of the present disclosure.

The UE may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g., the method in FIG. 8) with the receiving circuitry, the transmitting circuitry and the processor. That is, upon performing the computer executable instructions, the receiving circuitry receives random access occasion configuration, wherein the random access occasion configuration is associated with at least one of the following parameters of the UE: a propagation delay, a timing advance, a location, and a distance, then the processor selects a random access occasion from the random access occasion configuration.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method performed by a base station (BS), the method comprising:
   configuring, for one or more user equipment (UEs) in a serving cell of the BS, a delay-based random access occasion configuration based at least in part on a respective at least one delay parameter associated with each of the one or more UEs, wherein the delay-based random access occasion configuration includes:
   at least one random access occasion associated with an application condition threshold and a corresponding delay parameter of the respective at least one delay parameters, and
   at least one geographic reference location defined relative to the BS;
   transmitting the delay-based random access occasion configuration to the one or more UEs; and
   receiving, from the one or more UEs, one or more preambles within a preamble receiving window corresponding to the delay-based random access occasion configuration.

2. The method of claim 1, wherein the delay-based random access occasion configuration includes a reference location or multiple reference locations.

3. The method of claim 1, wherein the delay-based random access occasion configuration includes an area covered by a specific Synchronization Signal Block (SSB) beam that associates with one or more random access occasions.

4. The method of claim 1, wherein the respective at least one delay parameter is obtained from a UE of the one or more UEs, a core network, a location service functional entity, or a second BS.

5. A base station (BS) for wireless communication, comprising:
   at least one memory; and
   at least one processor coupled to the at least one memory and configured to cause the BS to:
   configure, for one or more user equipment (UEs) in a serving cell of the BS, a delay-based random access occasion configuration based at least in part on a respective at least one delay parameter associated with each of the one or more UEs, wherein the delay-based random access occasion configuration includes:
   at least one random access occasion associated with an application condition threshold and a corresponding delay parameter of the respective at least one delay parameters, and
   at least one geographic reference location defined relative to the BS;
   transmit the delay-based random access occasion configuration to the one or more UEs; and
   receive, from the one or more UEs, one or more preambles within a preamble receiving window corresponding to the delay-based random access occasion configuration.

6. The BS of claim 5, wherein the delay-based random access occasion configuration includes a reference location or multiple reference locations.

7. The BS of claim 5, wherein the delay-based random access occasion configuration includes an area covered by a specific Synchronization Signal Block (SSB) beam that associates with one or more random access occasions.

8. The BS of claim 5, wherein the delay-based random access occasion configuration is included in an information element or indicated in a parameter.

9. The BS of claim 5, wherein the respective at least one delay parameter is obtained from a UE of the one or more UEs, a core network, a location service functional entity, or a second BS.

10. The BS of claim 5, wherein the delay-based random access occasion configuration is included in RRC signaling or broadcasted in a system information block.

11. The BS of claim 5, wherein the application condition threshold indicates that the associated random access occasion is selected when the respective at least one delay parameter is within a range.

12. The BS of claim 5, wherein the delay-based random access occasion configuration indicates one or more random access occasion sets associated with one or more application condition thresholds, and the one or more application condition thresholds are associated with the respective at least one delay parameter.

13. The BS of claim 12, wherein the one or more application condition thresholds indicate that the associated random access occasion set is selected when the respective at least one delay parameter is within a range.

14. The BS of claim 5, wherein the delay-based random access occasion configuration includes one or more random access occasions determined based at least in part on the respective at least one delay parameter.

15. The BS of claim 5, wherein the delay-based random access occasion configuration includes a random access occasion set determined based at least in part on the respective at least one delay parameter.

16. A user equipment (UE) for wireless communication, comprising:
    at least one memory; and
    at least one processor coupled to the at least one memory and configured to cause the UE to:
    receive, from a base station (BS) a delay-based random access occasion configuration, wherein the delay-based random access occasion configuration is associated with at least one delay parameter of the UE, wherein the delay-based random access occasion configuration includes:

at least one random access occasion associated with an application condition threshold and the at least one delay parameter, and at least one geographic reference location defined relative to the BS; and select a random access occasion from the delay-based random access occasion configuration.

17. The UE of claim 16, wherein the delay-based random access occasion configuration includes a reference location or multiple reference locations.

18. The UE of claim 16, wherein the delay-based random access occasion configuration includes an area covered by a specific Synchronization Signal Block (SSB) beam that associates with one or more random access occasions.

19. The UE of claim 16, wherein the delay-based random access occasion configuration is included in an information element or indicated in a parameter.

20. The UE of claim 16, wherein the at least one processor is further configured to cause the UE to:

transmit the at least one delay parameter of the UE to the BS.

\* \* \* \* \*